US012383448B2

(12) United States Patent
Staarink et al.

(10) Patent No.: US 12,383,448 B2
(45) Date of Patent: Aug. 12, 2025

(54) BACKREST AND CHAIR

(71) Applicant: Life & Mobility Development B.V., Doetinchem (NL)

(72) Inventors: Henricus Antonius Maria Staarink, Numansdorp (NL); Marike Bijtelaar, Hulshorst (NL)

(73) Assignee: Life & Mobility Development B.V., Doetinchem (NL)

( * ) Notice: Subject to any disclaimer, the term of this patent is extended or adjusted under 35 U.S.C. 154(b) by 510 days.

(21) Appl. No.: 17/980,732

(22) Filed: Nov. 4, 2022

(65) Prior Publication Data

US 2024/0148576 A1 May 9, 2024

(51) Int. Cl.

*A61G 5/10* (2006.01)
*A47C 7/28* (2006.01)
*A47C 7/40* (2006.01)
*A47C 7/46* (2006.01)

(52) U.S. Cl.

CPC ............ *A61G 5/1067* (2013.01); *A47C 7/282* (2013.01); *A47C 7/40* (2013.01); *A47C 7/46* (2013.01)

(58) Field of Classification Search

CPC .... A61G 5/1067; A61G 5/0816; A61G 5/122; A61G 5/1091; A47C 7/282; A47C 7/40; A47C 7/46

See application file for complete search history.

(56) References Cited

U.S. PATENT DOCUMENTS

| | | | | | |
|---|---|---|---|---|---|
| 633,012 | A * | 9/1899 | Kidd | A47C 1/16 | 297/380 |
| 5,020,816 | A * | 6/1991 | Mulholland | A61G 5/08 | 280/42 |
| 6,186,594 | B1 | 2/2001 | Valiquette et al. | | |
| 6,733,074 | B2 * | 5/2004 | Groth | A61G 5/12 | 297/284.4 |
| 6,767,066 | B1 | 7/2004 | Tornero | | |
| 11,723,471 | B2 * | 8/2023 | Rajaratnam | A47C 7/46 | 297/284.4 |
| 2006/0202535 | A1 * | 9/2006 | Heidmann | A47C 7/46 | 297/354.1 |

(Continued)

FOREIGN PATENT DOCUMENTS

| | | | | |
|---|---|---|---|---|
| EP | 4085888 | A2 * | 11/2022 | A61G 5/1045 |
| IT | 1040012 | B * | 12/1979 | A47C 7/02 |
| JP | 2003000392 | A * | 1/2003 | A47C 7/024 |

(Continued)

*Primary Examiner* — Drew J Brown

(74) *Attorney, Agent, or Firm* — Banner & Witcoff, Ltd.

(57) ABSTRACT

Backrest for supporting the back of a seated person comprising a rigid backrest frame and a back support structure comprising substantially non-elastic, flexible sheet material. The non-elastic, flexible sheet material comprising a central region and at least four lateral segments, wherein the backrest support surface in its loaded condition has a form-stable, a three-dimensionally curved shape of which a cross-sectional view in the sagittal plane shows a backrest support surface curvature. Preferably, this backrest support surface curvature corresponds with the vertebral curvature at least in a region which corresponding with the lumbar region and a transition region which is formed by a lower part of the thoracic region and an upper part of the lumbar region.

22 Claims, 7 Drawing Sheets

(56) References Cited

U.S. PATENT DOCUMENTS

2006/0208552 A1 9/2006 Nishiwaki

FOREIGN PATENT DOCUMENTS

| | | | | |
|---|---|---|---|---|
| JP | 2006075257 | A | | 3/2006 |
| JP | 4721254 | B2 | * | 7/2011 |
| KR | 102165278 | B1 | * | 10/2020 |
| WO | 0160209 | A1 | | 8/2001 |
| WO | WO-2018197915 | A1 | * | 11/2018 |

* cited by examiner

BACKREST AND CHAIR

FIELD

The invention relates to a backrest for supporting the back of a seated person, as well as to a chair.

BACKGROUND

U.S. 61/865,954 B1 discloses a backrest for a wheel chair according to the pre-characterizing portion of claim 1. The backrest of US'954 comprises side posts which may be curved. Attached to the side posts are three horizontally extending straps, in particular an upper strap, an intermediate strap and a lower strap. A foam layer covered with a flexible sheet forms a cover layer which extends over the straps. The backrest additionally comprises a plurality of vertically extending substantially stiff metallic stays. It is disclosed that by adjusting (a) the angular and vertical positions of the side posts (b) the length of the upper strap, the intermediate strap and the lower strap, (c) the vertical position of the intermediate strap, and (d) the shape of the stays, the flexible contour wheelchair backrest is capable of adapting to a great number of users' back contour. The structural support which supports the load of the user is provided by the upper strap, the intermediate strap and the lower strap as well as by the vertically extending substantially stiff metallic stays. The flexible sheet with the foam layer only provides a covering layer but no structural support of the weight of the user nor does it define the shape of the contour of the backrest.

U.S. Pat. No. 6,767,066 B1 discloses a wheelchair with a backrest having a back frame which includes a pair of extruded opposing side frame members to which a flexible fabric is connected. The flexible fabric is of the woven elastomeric type designed to allow a high degree of air circulation and of which it is indicated that it is important that the stretch and resiliency is obtained with a bi-axial orientation of the elastomeric yarns to ensure proper relief of pressure points when a patient remains seated in the same position for a prolonged period. Bi-lateral (two directional) stretch is of particular importance in areas that exert high pressure such as at bone protrusions of the macro-lumbar region. In other words, the fabric is elastic and is not form stable under load conditions, but, to the contrary, is designed have resiliency and stretchability to conform to the shape of the back of the user.

US20060208552 discloses a bariatric chair having a backrest with a backrest frame having two spaced apart side structures embodied as tube members. Connected with these side tube members are horizontally extending vinyl straps which form a backrest front surface including an upper backrest front surface and a lower backrest front surface. It is commonly known that vinyl straps are elastic and do not provide a form stable support surface under load, but, to the contrary, continuously conform to the shape of the back of the user dependent on its sitting position.

JP4721254 B2 discloses a similar backrest construction. Instead of vinyl straps, the two spaced apart side structures support a plurality of horizontally extending slats, strips or hollow rod-shaped members which are interconnected like a blind screen and which is curved along a 2D-contour extending in a vertical cross-section but which is straight in any horizontal cross-section.

WO01/60209 A1 discloses a backrest which provides good support to the back of a seated person. As explained in that publication, support of the lumbar-thoracic transition region, i.e. the part of the back that extends approximately from the ninth thoracic vertebra from above (T9) to the second or third lumbar vertebra from above (L2/L3), can be used both functionally and constructionally for defining the desired posture first and subsequently supporting the lower part and preferably also the upper part of the back individually from there, irrespective of the shape of the individual back in sagittal and in transversal section. The individual posture support that can be achieved by this approach is maximal.

SUMMARY

The constructions described in WO01/60209 A1 and the other prior art discussed in the background section is relatively expensive.

The present invention has as an object to provide an alternative backrest which includes the advantages of the backrest of WO01/60209 A1 and of which the manufacturing costs may be lower and which may even provide even further improved support to the back of a seated person.

To that end, the invention provides a backrest for supporting the back of a seated person according to claim 1.

As shown in FIGS. 7A, 7B and 7C, and as generally known, the human vertebral column has a sacral region, a lumbar region defined by lumber vertebrae (L1-L5), a thoracic region defined by thoracic vertebrae (T1-T12) and a cervical region defined by cervical vertebrae (C1-C7). When viewed in a cross section along a sagittal plane the vertebral column has a vertebral curvature.

The backrest comprises a rigid backrest frame and a back support structure.

The rigid backrest frame has two opposite lateral backrest frame members. The lateral backrest frame members are shaped along a lateral backrest frame curvature. In practice, the backrest frame curvature, when viewed from a lateral side, substantially corresponds to the vertebral curvature at least in an upper part of the lumbar region and a lower part of the thoracic region.

The back support structure comprises flexible sheet material.

According to the invention, the flexible sheet material is substantially non-elastic and comprises a central region and at least four lateral segments. The central region has two opposite lateral edges and an upper and a lower edge. Each lateral segment of the at least four lateral segments has an inner and an outer lateral edge. Each lateral segment is connected with its inner lateral edge with the lateral edge of the central region and with its outer edge with an associated one of the lateral backrest frame member. The lateral segments are arranged in pairs of lateral segments which are connected to the central region at the same height to the opposite lateral edges of the central region. A first pair of lateral segments is connected to a first central region segment and a second pair of lateral segments is connected to a second central region segment.

The non-elastic flexible sheet material provides, in a loaded condition, i.e. when a person is resting with his back against the backrest, a form-stable backrest support surface having a three-dimensionally curved shape of which a cross-sectional view in the sagittal plane, i.e. a substantially vertical plane which is centrally positioned between the two lateral backrest frame members, has a backrest support surface curvature.

In practice, this backrest support surface curvature substantially corresponds with the vertebral curvature at least in a region which corresponds with the lumbar region and a transition region which is formed by a lower part of the thoracic region and an upper part of the lumbar region. The invention also provides a chair for supporting a seated person according to claim 18. In particular the invention provides a chair comprising a seat and the backrest according to the invention. The chair may include wheels so as to form a wheelchair.

Due to the provision of at least two pairs of lateral segments, the shape and the position/orientation of the first central region segment and the second central region segment may be selected as best fitted to the user by selecting the desired shape of the opposite lateral backrest frame members. Due to the non-elastic flexible sheet material of the back support structure, a firm backrest support is provided which is of the essence for a good long term support of the seated person. Elastic sheet material, e.g. elastic knitted fabric, is not feasible for the back support structure according to the invention because the position stability of the seated person would not be provided.

The curvature of the backrest frame, together with the size of the central region, the sizes of the lateral segments, and the placement of the lateral segments with respect to the central region and their associated lateral backrest frame member, all have an effect on the form-stable three-dimensionally curved shape of the backrest support surface. These may all be chosen such that the backrest offers optimal support for the back of the seated person.

The vertebral column is supported by the central region. The sides of the back, i.e. the parts of the back lateral to the vertebral column, are supported by the lateral segments.

Best support is provided if a critical support region of the vertebral column is firmly supported in a fixed position and orientation. The critical support region is formed by the lumbar region and the transition region formed by the lower part of the thoracic region and the upper part of the lumbar region. The transition region of the lower part of the thoracic region and the upper part of the lumbar region runs approximately from the second lumbar vertebra (L2) to the ninth thoracic vertebra (T9). With the backrest and the chair according to the invention, optimal support for the critical support region is achieved by having the size and the position of the segments such that the curvature of the back support structure at the position associated with the critical support region, matches the curvature of the region. Because the back support structure of the backrest and the seat according to the invention is made of a non-elastic material, it will not stretch in a loaded condition. This means that the backrest support surface not only is positioned and oriented in the optimal position for giving optimal support to the back of the seated person, but also will remain in that position and orientation.

In another aspect, a chair is provided, optionally including a backrest according to the invention, wherein the chair has seat comprising a rigid seat frame and a seat support structure. The rigid seat frame has two opposite lateral seat frame members. The lateral seat frame members are shaped along a lateral seat frame curvature.

The lateral seat frame curvature, when viewed from a lateral side, substantially corresponds to a buttock curvature when viewed in cross section along a sagittal plane.

The seat support structure comprises flexible sheet material.

According to the invention, the flexible sheet material is substantially non-elastic and comprises a central seat region having two opposite lateral edges and a front and a rear edge. Additionally, the seat support structure comprises at least four lateral seat segments. Each lateral seat segment has an inner and an outer lateral edge and is connected with its inner lateral edge with the lateral edge of the central seat region and with its outer edge with a lateral seat frame member. The lateral seat segments are arranged in pairs of lateral seat segments which are connected to the central seat region at directly opposite parts of the lateral edges of the central seat region. A first pair of lateral seat segments is connected to a first central seat region segment. A second pair of lateral seat segments is connected to a second central seat region segment. The non-elastic flexible sheet material provides, in a loaded condition, i.e. when a person is resting with his buttocks on the seat, a form-stable seat support surface having a three-dimensionally curved shape of which a cross-sectional view in the sagittal plane, i.e. a substantially vertical plane which is centrally positioned between the two lateral seat frame members, has a seat support surface curvature.

The seat support surface curvature substantially corresponds with the buttocks curvature and the three-dimensionally curved seat support surface substantially corresponds to the three-dimensionally curved, anatomical shape of the buttocks of the seated person.

Thus, a chair is provided with a stably supporting seat. The pressure distribution on the buttocks of the user is optimal due to the 3D-shape of the seat support structure. In particular when the angle of the first central seat region is set correctly, any shear forces between the buttocks of the user and the seat support structure may be minimalized. The seat has the additional advantage that the chair with the seat may be collapsible.

The present invention will be further elucidated with reference to figures of an example in which various embodiments of the invention are incorporated. The embodiments may be combined or may be applied separately from each other.

DETAILED DESCRIPTION

In this application similar or corresponding features are denoted by similar or corresponding reference signs. The description of the various embodiments is not limited to the examples shown in the figures and the reference numbers used in the detailed description and the claims are not intended to limit the description of the embodiments, but are included to elucidate the embodiments by referring to the example shown in the figures.

Figures 7A, 7B, 7C:
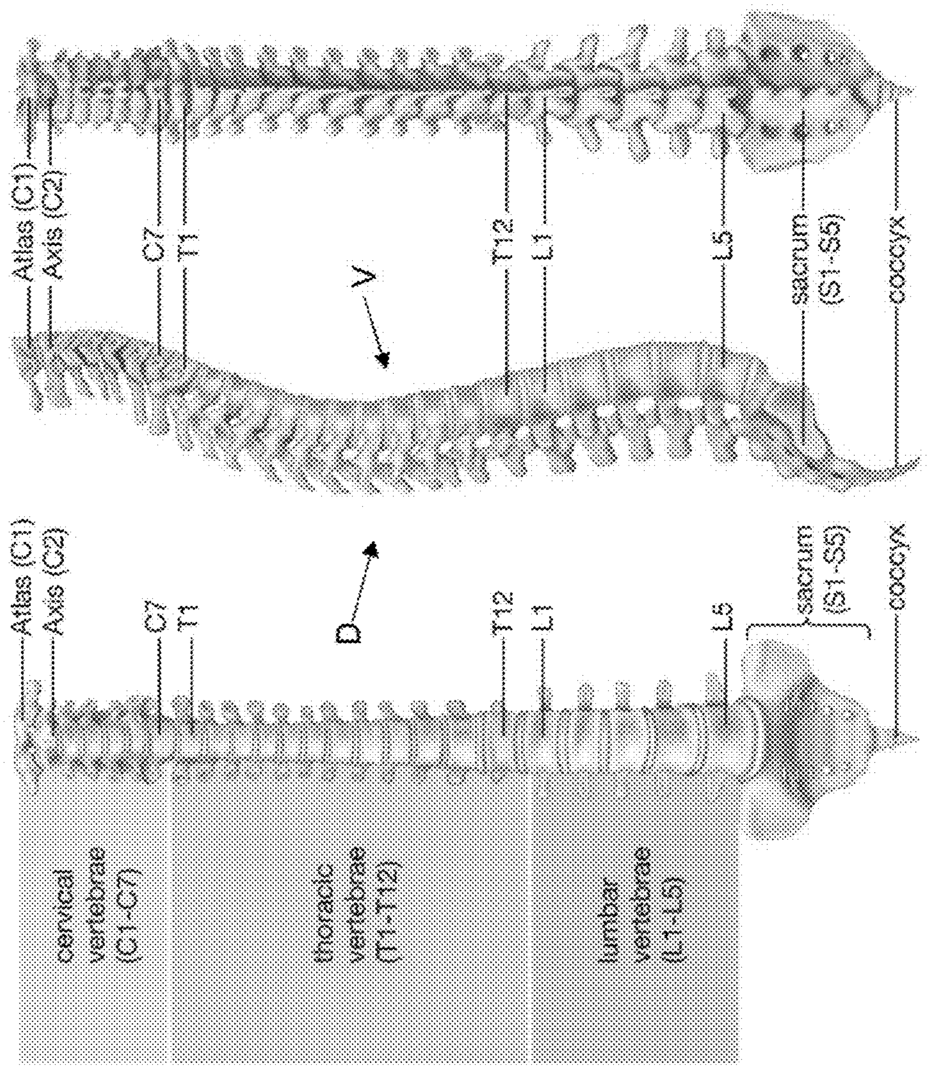
FIGS. 7A, 7B, 7C show a front view, a side view and a rear view of the human vertebral column.

In the most general terms, the invention relates to a backrest 10 for supporting the back of a seated person. As explained in the summary and shown in FIGS. 7A, 7B, and 7C, the human vertebral column has a sacral region, a lumbar region defined by lumber vertebrae L1-L5, a thoracic region defined by thoracic vertebrae T1-T12 and a cervical region defined by cervical vertebrae C1-C7. When viewed in a cross section along a sagittal plane has a vertebral curvature. The vertebral curvature is also visible in the side view of FIG. 7B.

The backrest 10 comprises a rigid backrest frame 16 and a back support structure 22.

The rigid backrest frame 16 has two opposite lateral backrest frame members 18, 20. The lateral backrest frame members 18, 20 are shaped along a lateral backrest frame curvature which, when viewed from a lateral side, substantially corresponds to the vertebral curvature at least in an upper part of the lumbar region and a lower part of the thoracic region.

The back support structure 22 comprises substantially non-elastic, flexible sheet material.

In an embodiment, the substantially non-elastic flexible sheet material may be chosen from the group the group consisting of canvas, cloth and foil. Substantially non-elastic is to be construed as a material which, when used in the seat support structure substantially does not have an elastic or deflecting behaviour when being subjected to a load. The characterization of fabrics with respect to elasticity and non-elasticity depends on many factors, like weave structure, type of coatings applied etc. as well as the direction in which the forces are applied relative to the weave pattern. A well-defined method for characterizing fabrics is provided in DIN EN ISO 1421/1 which defines a tensile strength at breakage, as well as the elongation at breakage of a test strip. On the basis of DIN EN ISO 1421/1 the term "substantially non-elastic" used in this embodiment refers to sheet material having an elongation at breakage of less than 50% in any direction of pulling. An example of a flexible sheet material within the material group which is generally referred to as canvas and which complies with the above defined requirement of having an elongation at breakage of less than 50% in any direction of pulling is Cordura 5080 of the Firm C.F. Weber GmbH from Spitzkunnersdorf, Germany. Typically, this is a polyamide 6.6 material with a plain weave structure which has been subjected to a water, oil and dirt repellency fluorocarbon treatment and which has been coated with a flame retardant PU dispersion coating.

The substantially non-elastic flexible sheet material comprises a central region 26, 28, 30 and at least four lateral segments 34*a*, 34*b*, 36*a*, 36*b*, 38*a*, 38*b*. The central region 26, 28, 30 has two opposite lateral edges 32 and an upper and a lower edge. Each lateral segment 34*a*, 34*b*, 36*a*, 36*b*, 38*a*, 38*b* of the at least four lateral segments 34*a*, 34*b*, 36*a*, 36*b*, 38*a*, 38*b* has an inner and an outer lateral edge. Each lateral segment 34*a*, 34*b*, 36*a*, 36*b*, 38*a*, 38*b* is connected with its inner lateral edge with the lateral edge 32 of the central region 26, 28, 30 and with its outer edge with an associated one of the lateral backrest frame member 18, 20. The lateral segments 34*a*, 34*b*, 36*a*, 36*b*, 38*a*, 38*b* are arranged in pairs of lateral segments which are connected to the central region 26, 28, 30 at the same height to the opposite lateral edges 32 of the central region 26, 28, 30. A first pair of lateral segments 34*a*, 34*b* is connected to a first central region segment 26 and a second pair of lateral segments 36*a*, 36*b* is connected to a second central region segment 28.

The non-elastic flexible sheet material provides, in a loaded condition, i.e. when a person is resting with his back against the backrest, a form-stable backrest support surface 24 having a three-dimensionally curved shape of which a cross-sectional view in the sagittal plane, i.e. a substantially vertical plane which is centrally positioned between the two lateral backrest frame members 18, 20, has a backrest support surface curvature. The backrest support surface curvature substantially corresponds with the vertebral curvature at least in a region which corresponding with the lumbar region and a transition region which is formed by a lower part of the thoracic region and an upper part of the lumbar region.

The effects and advantages of the backrest 10 have been described in the summary section and these effects and advantages are inserted here by reference.

Preferably, the first pair of lateral segments 34*a*, 34*b* connected to the first central region segment 26 are connected at a height of the lateral backrest frame members 18, 20 so that the first central region segment 26 supports the back of the seated person in the transition region of the vertebral column formed by the lower part of the thoracic region and the upper part of the lumbar region.

Thus, the transition region is supported by a dedicated part of the central region 26, 28, 30 and lateral segments 34*a*, 34*b*, 36*a*, 36*b*, 38*a*, 38*b* namely the first central region segment 26 and the first pair of lateral segments 34*a*, 34*b*. These parts may be dimensioned or adjusted such that the transition region of the seated person is optimally supported. With setting the height of the first central region segment 26 and associated lateral segments 34*a*, 34*b* such that it matches the position of the transition region of the vertebral column of the seated person, support of said part of the vertebral column is improved.

The second pair of lateral segments 36*a*, 36*b* which are connected to the second central region segment 28 may be connected at a height of the lateral backrest frame members 18, 20 so that the second central region segment 28 supports the back of the seated person in a lower part of the lumbar region.

Thus, the lower part of the lumbar region is supported by a dedicated part of the central region 26, 28, 30 and lateral segments 34*a*, 34*b*, 36*a*, 36*b*, 38*a*, 38*b* namely the second central region segment 28 and the second pair of lateral segments 36*a*, 36*b*. These parts may be dimensioned or adjusted such that the lower part of the lumbar region is optimally supported. With setting the height of the second central region segment 28 and associated lateral segments 36*a*, 36*b* such that it matches the position of the lower part of the lumbar region of the seated person, support of said part of the vertebral column is improved.

Accordingly, firm support is given to the entire critical support region of the vertebral column of the seated person.

In an embodiment, the at least four lateral segments 34*a*, 34*b*, 36*a*, 36*b*, 38*a*, 38*b* may comprise a third pair of lateral segments 38*a*, 38*b* connected to a third central region segment 30.

Apart from the above described critical support regions of the vertebral column, other parts may be supports as well. The third central region segment 30 may e.g. support an upper part of the thoracic region, of which examples are shown in the figures.

Preferably, the third pair of lateral segments 38*a*, 38*b* which are connected to the third central region segment 30 may be connected at a height of the lateral backrest frame members 18, 20 so that the third central region segment 30 supports the back of the seated person in an upper part of the thoracic region and optionally a lower part of the cervical region.

Thus, the upper part of the thoracic region and optionally a lower part of the cervical region are supported by a dedicated part of the central region 26, 28, 30 and lateral segments 34*a*, 34*b*, 36*a*, 36*b*, 38*a*, 38*b* namely the third central region segment 30 and the third pair of lateral segments 38*a*, 38*b*. These parts may be dimensioned or adjusted such that the upper part of the thoracic region and optionally a lower part of the cervical region are optimally supported. With setting the height of the third central region segment 30 and associated lateral segments 38*a*, 38*b* such that it matches the position of the upper part of the thoracic region of the seated person, support of said part of the vertebral column is improved.

In an embodiment, of which no example is shown in the figures, the at least four lateral segments 34*a*, 34*b*, 36*a*, 36*b*, 38*a*, 38*b* comprise a fourth pair of lateral segments connected to a fourth central region segment. The fourth pair of lateral segments which are connected to the fourth central region segment may be connected at a height of the lateral backrest frame members 18, 20 so that the fourth central region segment supports the back of the seated person in the sacral region.

Similar to the first to third central region segments 26, 28, 30, the fourth central region segment may support a determined part of the vertebral column of the seated person. For support of the sacral region, the fourth central region segment should be more to the dorsal side with respect to the part which supports the lumbar region, in order to accommodate the buttocks of the seated person.

Figure 1:
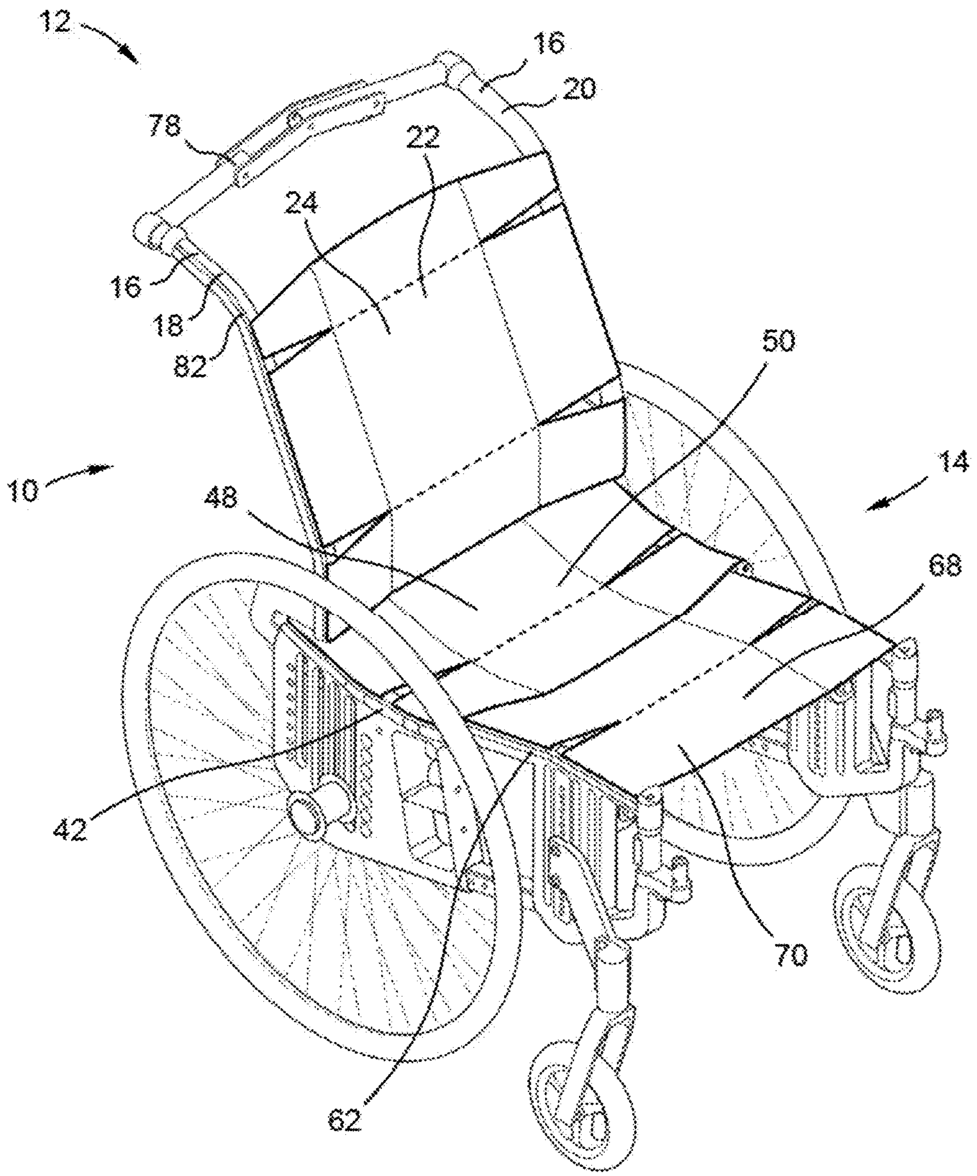
FIG. 1 shows a perspective view of an example of a wheelchair according to the invention.
Figure 2:
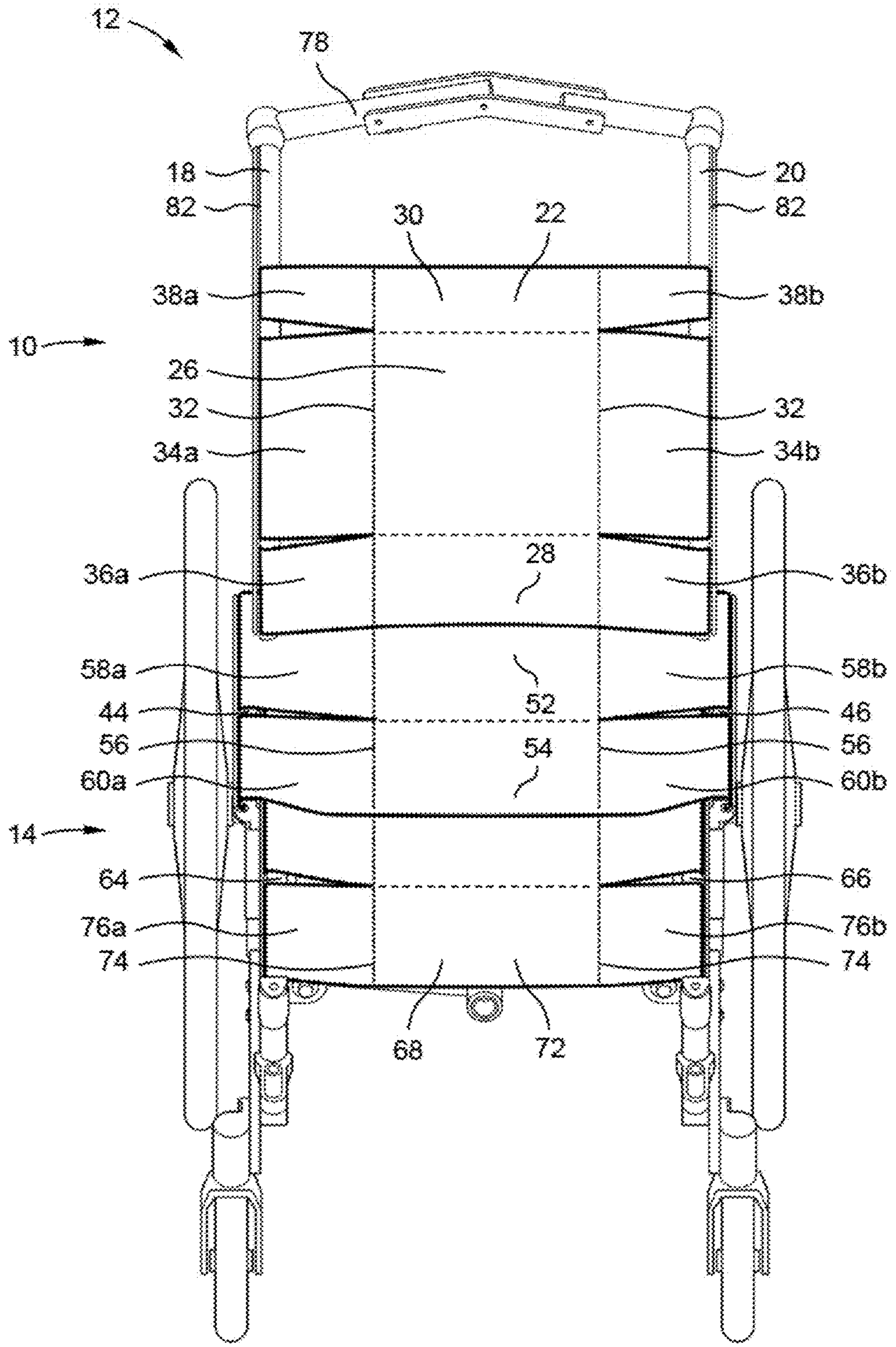
FIG. 2 shows a front view of the example of FIG. 1.
Figure 3:
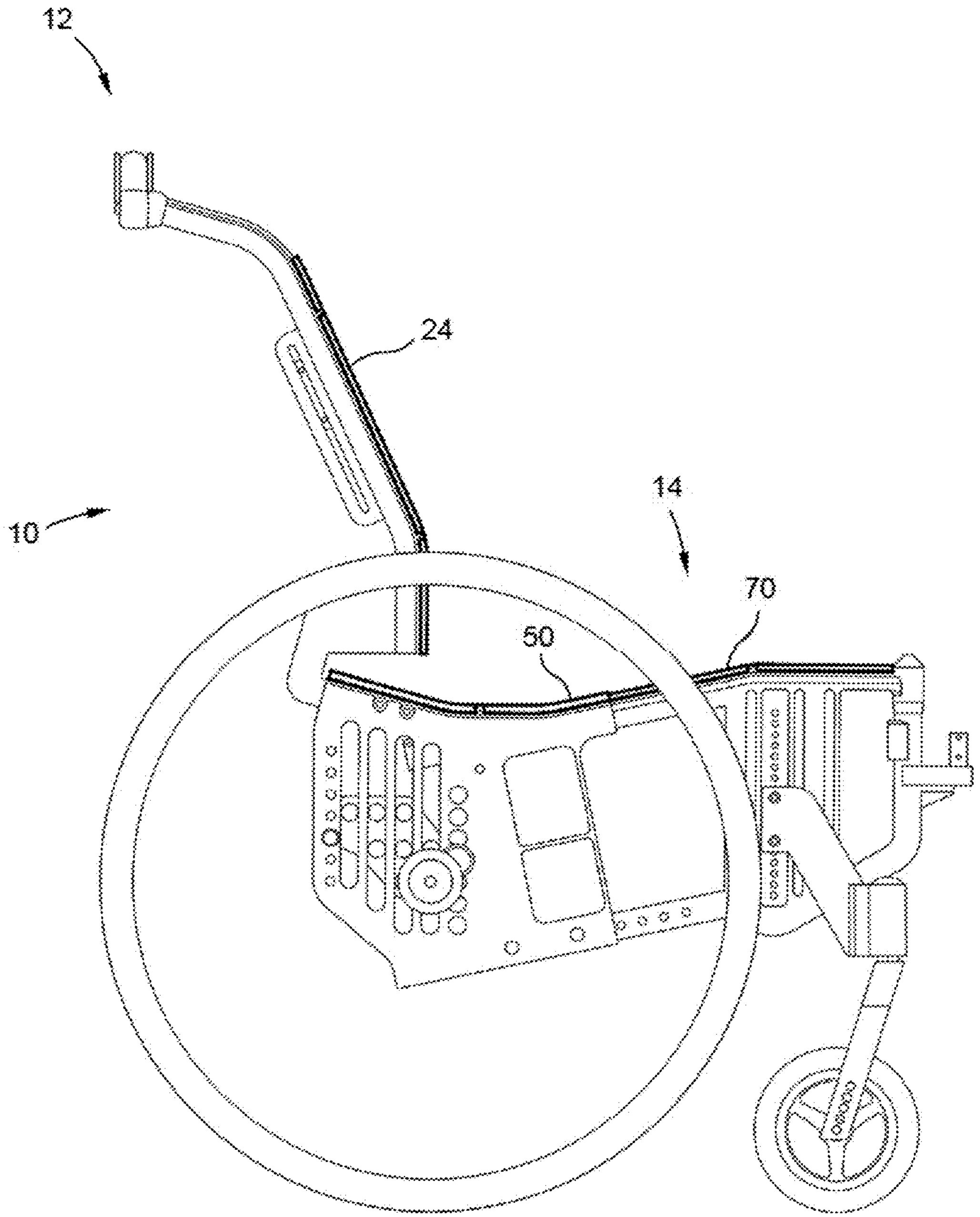
FIG. 3 shows a side view of the example of FIGS. 1 and 2.

In an embodiment, of which an example is shown in FIGS. 1-3, each lateral segment 34*a*, 34*b*, 36*a*, 36*b*, 38*a*, 38*b* may comprise a patch of non-elastic, flexible sheet material. The central region 26, 28, 30 comprises at least one patch of non-elastic, flexible sheet material, wherein the lateral patches 34 are connected to the central region 26, 28, 30 by seams.

The patches may be stitched or sewn together. Alternatively, the connection may be realised with adhesive or by weld seals. The patches form different surfaces which may be fitted together and be connected to the lateral frame members 18, 20 in such a way that the non-elastic flexible sheet material has a three-dimensional shape which preferably follows the three-dimensional shaped contours of the vertebral column of the seated person.

Each of the first and second segments 26, 28 of the central region may comprise a patch of non-elastic, flexible sheet material, wherein an upper edge of the patch forming the second segment 28 is connected by a seam to a lower edge of the patch forming the first segment 26. Also, the third segment 30 of the central region may comprises a patch of non-elastic, flexible sheet material, wherein the lower edge of the patch forming the third segment 30 is connected by a seam to an upper edge of the patch forming the first segment 26. Furthermore, the fourth segment of the central region may also comprise a patch of non-elastic, flexible sheet material, wherein an upper edge of the patch forming the fourth segment is connected by a seam to a lower edge to a lower edge of the patch forming the second segment 28.

By each of the first and second central region segments 26, 28, and optionally the third and fourth central region segments 30 having their own patch, each of these segments 26, 28, 30 is clearly defined. Also, the seam between the patches of the first and second central region segments 26, 28, between the patches of the first and third central region segments 26, 30, and between the patches of the second and fourth central region segments 30, may provide a flexible edge or ridge between the two respective segments 26, 28, 30 This may provide that the shape of the central region 26, 28, 30 may be better tailored to a user so as to follow the curves of the vertebral column of the seated person more closely. The seams between the patches forming the first central region segment 26, the second central region segment 28, and the optional third central region segment 30, and the optional fourth central region segment (not shown) may provide some additional stiffness relative to the flexible sheet material which may promote the form stability of the central region of the non-elastic flexible sheet material of the back support structure 22.

In an alternative embodiment, the central region 26, 28, 30 may be integrally formed from a single patch of non-elastic flexible sheet material, as is shown in FIGS. 1-3. Thus, production of the back support structure 22 according to this embodiment may be more cost effective.

Figure 4:
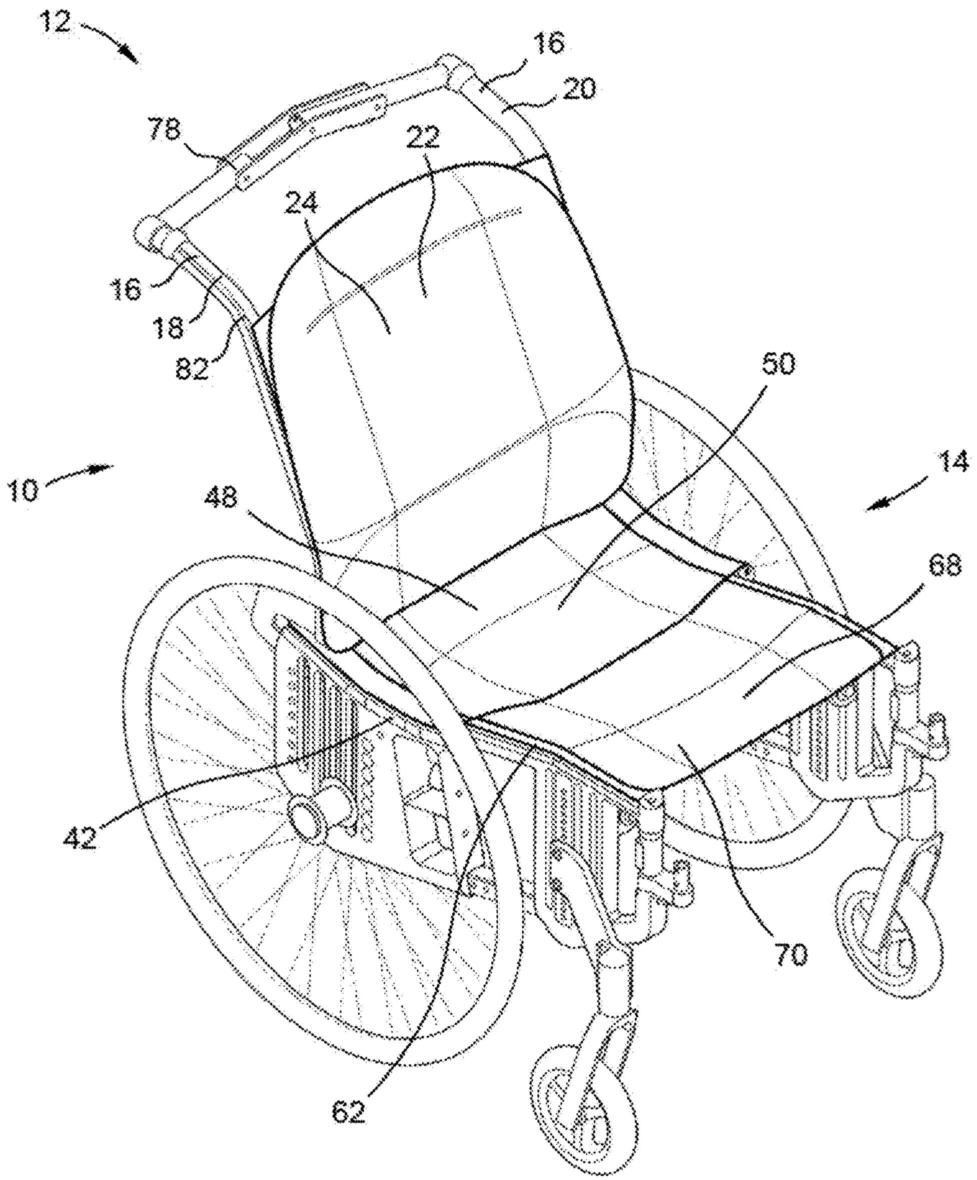
FIG. 4 shows a perspective view of another example of a wheelchair according to the invention.
Figure 5:
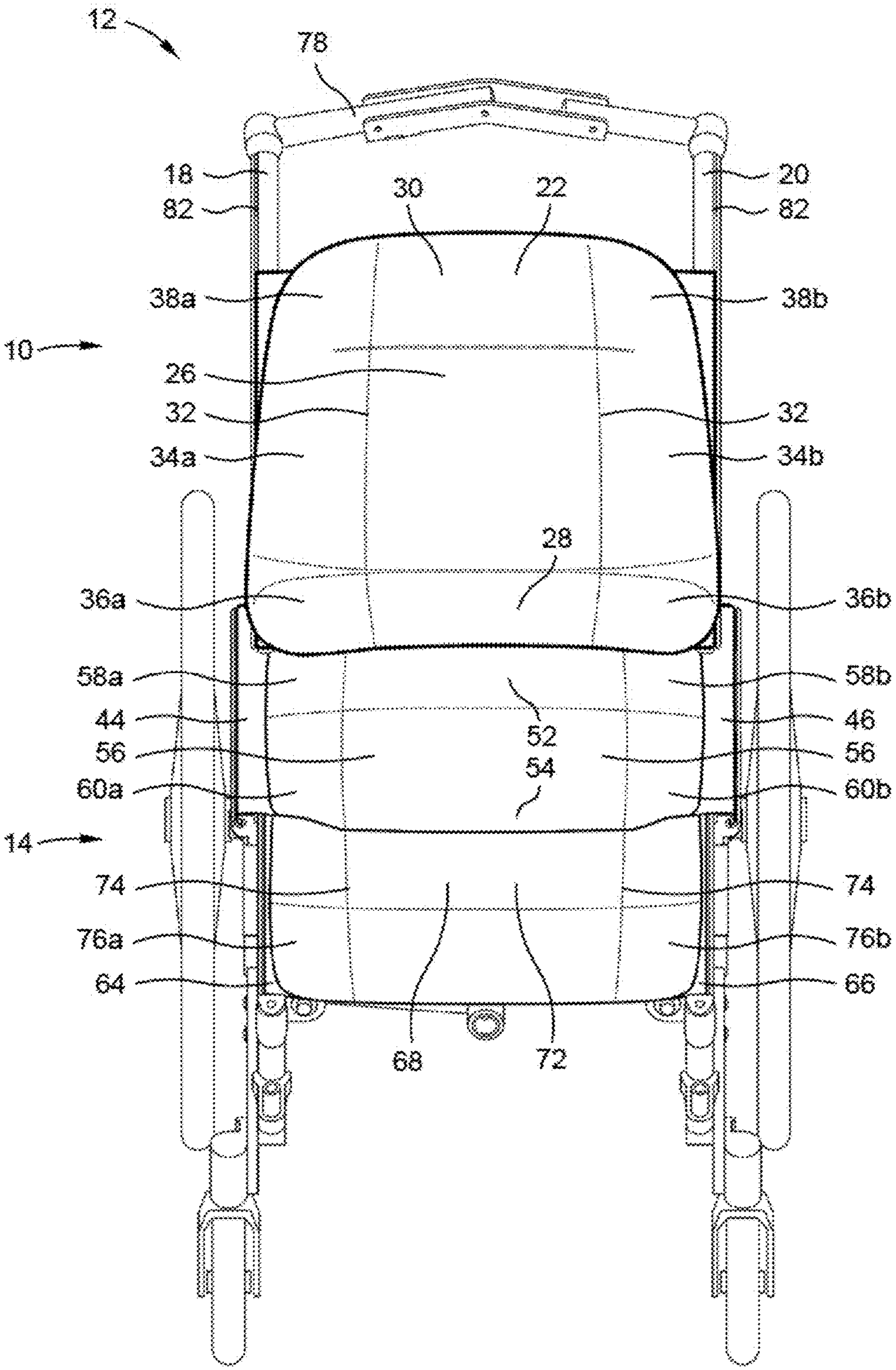
FIG. 5 shows a front view of the example of FIG. 4.
Figure 6:
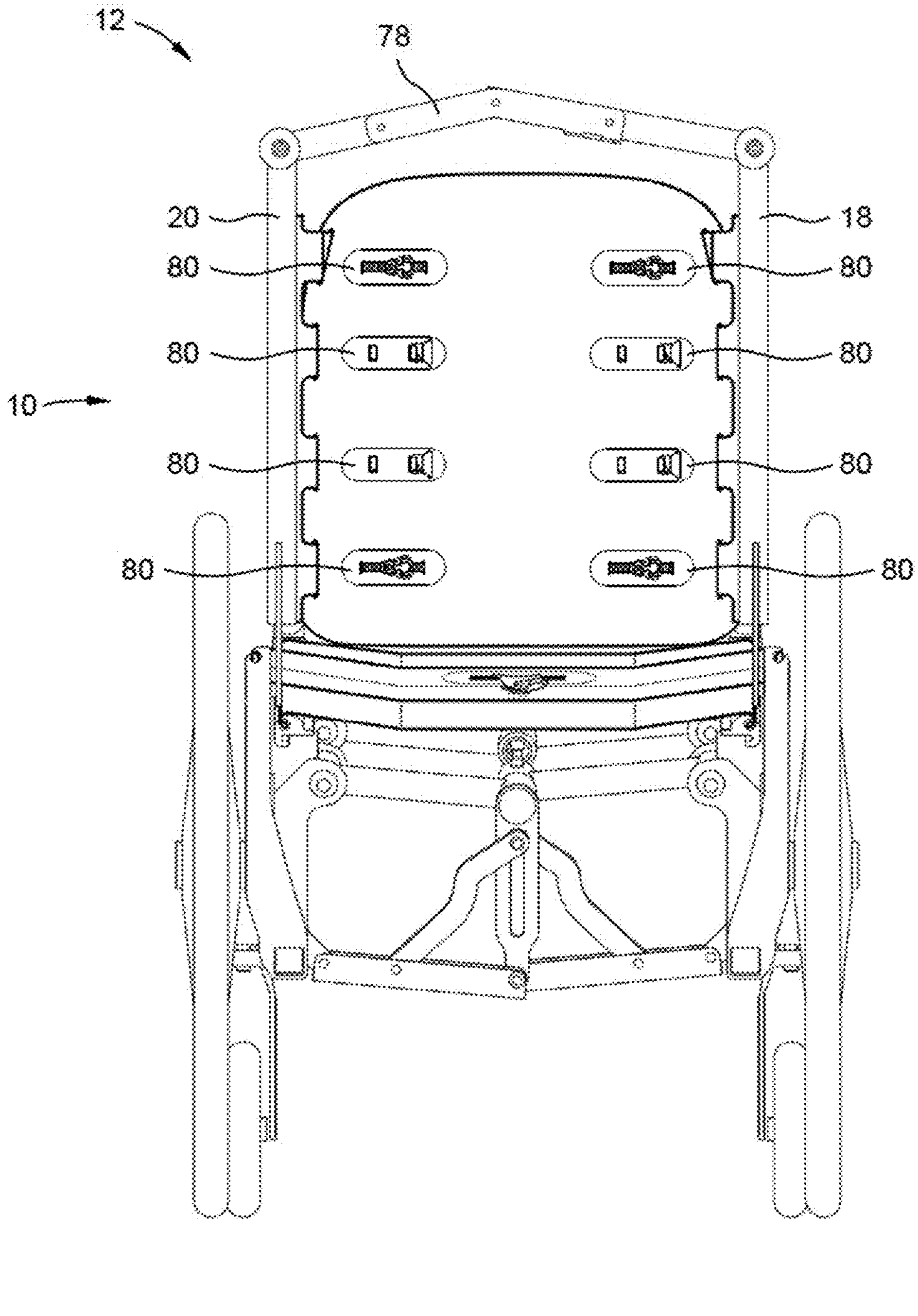
FIG. 6 shows a rear view of the example of FIGS. 4 and 5.

The back support structure 22 may be formed from a single piece of substantially non-elastic flexible sheet material as shown in the example of FIGS. 4-6.

With this implementation of the back support structure 22 no seams are necessary at all and production costs may be further reduced relative to an embodiment having a plurality of patches which are connected by seams.

In an embodiment, the rigid backrest frame 16 may be collapsible from a working condition to a collapsed condition. In the working condition the lateral backrest frame members 18, 20 are spaced apart from each other at a first distance. In the collapsed condition the lateral backrest frame members 18, 20 are moved towards each other and the back support structure 22 is folded in a collapsed condition.

The backrest 10 in a collapsed condition of the back support structure 22, may take up less space than in the working condition. This facilitates storing of the backrest 10 when it is not used. Thus, the backrest 10 may be part of a collapsible wheelchair 12. The wheelchair 12 with the collapsible backrest 10 may be brought in a collapsed state without having to disassemble the backrest 10 from the other parts of the wheelchair 12. The collapsibility of the back support structure 22 may be provided by hinges in a cross member 78 which connects the lateral backrest frame members 18, 20, as can been seen in the figures.

In an embodiment, each lateral backrest frame member 18, 20 is composed of an upper lateral backrest frame member part and a lower lateral backrest frame member part. The upper and the lower lateral backrest frame member parts may be pivotable with respect to each other around a substantially horizontally extending pivot axis. The lateral segments of the first pair of lateral segments 34*a*, 34*b* are each connected to the upper lateral backrest frame member part associated with that lateral segment 34*a*, 34*b*, and the lateral segments of the second pair of lateral segments 36*a*, 36*b* are each connected to the lower lateral backrest frame member part associated with that lateral segment 36*a*, 36*b*. The lower lateral backrest frame member parts can be fixed in various pivot positions to support the buttocks of the seated person.

In this way the second central region segment 28, which supports the lower part of the lumbar region, is pivotable with respect to the first central region segment 26, which supports the transition region of the vertebral column. The first central region segment 26 may be fixed relative the seated person to provide optimal support for the vertebral column of the seated person, while the second central region segment 28 may be adjusted to accommodate different sizes of buttocks.

When being part of a chair or wheelchair 12, the upper lateral backrest frame member parts may e.g. be non-movably attached to a main frame of the chair 12. The lower lateral backrest frame member parts may then be pivotable with respect to the main frame of the chair 12.

In an embodiment, of which an example is shown in FIG. 3, the first central region segment 26 may, in the loaded condition, extend in a plane that encloses an angle with a horizontal plane in a range between 100° and 130°, preferably approximately 115°.

Such an angle provides an optimal sitting angle for supporting the back of the seated person.

The lateral backrest frame members 18, 20 may each comprise one or more rigid, bended backrest frame tubes.

Tubes are both rigid and relatively light and can be easily shaped along a curve in a bending machine. They are strong enough to give the required support, and also light enough to be able to handle the backrest 10, e.g. as part of a wheelchair 12.

In an embodiment, the outer edges of the lateral segments 34*a*, 34*b*, 36*a*, 36*b*, 38*a*, 38*b* may be provided with a cord. Each lateral backrest frame member 18, 20 may comprise a groove 82 extending along the length of the lateral backrest frame member 18, 20 and having a groove opening extending along the length of the groove 82 with a width which is smaller than an outer diameter of the cord. The cord is mounted in the groove 82 for connecting the outer edges of the lateral segments to an associated one of the lateral backrest frame members 18, 20.

The outer edges of the lateral segments 34*a*, 34*b*, 36*a*, 36*b*, 38*a*, 38*b* may be provided with at least two seam tunnels in which the cord is selectively accommodated, wherein the tunnel in which the cord is accommodated is mounted in the groove 82 for connecting the outer edges of the lateral segments 34*a*, 34*b*, 36*a*, 36*b*, 38*a*, 38*b* to an associated one of the lateral backrest frame members 18, 20.

The cord and groove 82 combination provide an easy way to attached and detach the back support structure 22 to and from the backrest frame 16. The cord may be pulled though the groove 82 in a longitudinal direction. When in a loaded condition of the backrest support structure 22, the cord will remain in the groove 82 because it cannot pass the groove opening. By having multiple seam tunnels the cord may be selectively placed in any of these. In this way the width of the back support structure 22 may be chosen and adapted to the size and shape of the seated person. Thus, the curvature of the backrest support structure 22 in a horizontal cross-section may be varied so as to provide a more flat or a deeper, i.e. more concave backrest support structure 22.

In an embodiment, of which an example is shown in FIG. 6, each lateral segment 34*a*, 34*b*, 36*a*, 36*b*, 38*a*, 38*b* of a pair of segments may be associated with a strap 80 for setting the lateral width of each one of the lateral segments 34*a*, 34*b*, 36*a*, 36*b*, 38*a*, 38*b* of the pair of lateral segments.

The straps 80 may serve to adjust the width of the back support structure 22. Similar to the multiple tunnel seams, the straps 80 may be used vary the shape of the back support structure 22 from flat to deep and vice versa as explained in the previous embodiment.

Each lateral segment of the first pair of lateral segments 34*a*, 34*b* may be associated with two straps 80 each having only a discrete number of setting lengths, e.g. two setting lengths. Each lateral segment of the second and the optional third and fourth lateral segments 36*a*, 36*b*, 38*a*, 38*b* may be each associated a single strap 80 of which the length is settable along a continuous range.

When adjusting the backrest support structure 22 for a user, the straps 80 of the first lateral segments 34*a*, 34*b* only have a discrete number of setting lengths, should be adjusted first. Thus, the angle of the first central region segment 26 relative to the horizontal may be varied in just two or three positions and the curvature in a horizontal cross-sectional plane at the level of the first central region segment 26 may be varied between two variants, namely flat and deep, i.e. more concave than in the flat condition. After setting the straps 80 of the first pair of lateral segments 34*a*, 34*b*, the straps 80 of the other lateral segments 36*a*, 36*b*, 38*a*, 38*b* can then be adjusted afterwards. This means that the most important part for supporting the back of the seated person, namely the first central region segment 26, connected to the first pair of lateral segments 34*a*, 34*b*, is adjusted first without being hindered by the setting of the other straps 80. After positioning and orienting the first central region segment 26 at the right height and angle, the main seating position for the user is defined. Subsequently, the amount of lateral support may be varied by tensioning or loosening the straps 80 of the second and the optional third and fourth pairs of lateral segments 36*a*, 36*b*, 38*a*, 38*b*. Thus, an optimal support for the back of the seated person may be ensured.

In an embodiment, a lateral width of the back support structure 22 may be variable by means of three or more zippers halves extending parallel and with which the width of the lateral segments 34*a*, 34*b*, 36*a*, 36*b*, 38*a*, 38*b* or, alternatively, the central region 26, 28, 30 may be selectively settable.

The user can select two zipper halves to zip up. By selecting which zipper halves to zip up, the width of the lateral segments 34*a*, 34*b*, 36*a*, 36*b*, 38*a*, 38*b* or, alternatively, the central region 26, 28, 30 is set. The effects are similar to effects described with reference to the above mentioned embodiment in which the cord is selectably placed in one of the multiple of seam tunnels.

The invention also relates to a chair 12 for supporting a seated person. The chair 12, of which an example is shown in the figures, may include wheels so as to form a wheelchair 12. The chair 12 comprises the backrest 10 according to the invention as well as a seat.

The effects and advantages of the chair 12 have been described in the summary section and these effects and advantages are inserted here by reference.

In an embodiment, the seat 14 of the chair mentioned above may comprise a rigid seat frame 42 and a seat support structure 48 comprising substantially a flexible sheet material. The rigid seat frame 42 has two opposite lateral seat frame members 44, 46. The lateral seat frame members 44, 46 are shaped along a lateral seat frame curvature. Preferably, the lateral seat frame curvature, when viewed from a lateral side, substantially corresponds to a buttock curvature when viewed in cross section along a sagittal plane.

According to the invention, the flexible sheet material is substantially non-elastic and comprises a central seat region 52, 54 and at least four lateral seat segments 58*a*, 58*b* 60*a*, 60*b*. The central seat region 52, 54 has two opposite lateral edges 56 and a front and a rear edge. Each lateral seat segment 58*a*, 58*b* 60*a*, 60*b* of the at least four lateral seat segments 58*a*, 58*b* 60*a*, 60*b* has an inner and an outer lateral edge. Each lateral seat segment 58*a*, 58*b* 60*a*, 60*b* is connected with its inner lateral edge with the lateral edge 56 of the central seat region 52, 54 and with its outer edge with a lateral seat frame member 44, 46. The lateral seat segments 58*a*, 58*b* 60*a*, 60*b* are arranged in pairs of lateral seat segments 58*a*, 58*b* 60*a*, 60*b* which are connected to the central seat region 52, 54 at directly opposite parts of the lateral edges 56 of the central seat region 52, 54. A first pair of lateral seat segments 58*a*, 58*b* is connected to a first central seat region segment 52 and a second pair of lateral seat segments 60*a*, 60*b* is connected to a second central seat region segment 54.

The non-elastic flexible sheet material provides, in a loaded condition, i.e. when a person is resting with his buttocks on the seat 14, a form-stable seat support surface 50 having a three-dimensionally curved shape of which a cross-sectional view in the sagittal plane, i.e. a substantially vertical plane which is centrally positioned between the two lateral seat frame members, shows a seat support surface curvature. The seat support curvature substantially corresponds with the buttocks curvature, and the three-dimensionally curved seat support surface substantially corresponds to the three-dimensionally curved, anatomical shape of the buttocks of the seated person.

It should be noted that the invention also relates to a chair having the above-described seat 14 but a different type of backrest than the one claimed in claims 1-19. In other words, the chair 12 according to claim 20 may applied independently from the backrest according to the invention.

The seat support structure 48 is similar to the back support structure 22. The effects and advantages of the back support structure 22 mentioned in this disclosure, apply mutatis mutandis to the seat support structure 48. Thus, a chair 12 is provided with a stably supporting seat 14 which has the additional advantage that the chair may be collapsible.

In an embodiment the first central seat region segment 52 substantially extends in a plane that includes an angle with a horizontally extending plane in the range of 5° to 15°, more preferably 12°.

Such an angle provides an optimal sitting angle for supporting the buttocks and/or tights of the seated person.

In an embodiment, the seat 14 additionally comprises a front part comprising a front seat frame 62 and a front seat support structure 80. The front seat frame 62 has two opposite lateral front seat frame members 64, 66, of which the position is adjustable relative to the backrest 10 and the rigid seat frame 42 in a front and rear direction. The front seat support structure 68 comprises substantially non-elastic flexible sheet material. The front seat support structure 68 provides, in a loaded condition, i.e. when a person is resting with his buttocks on the seat, a form-stable front seat support surface 70.

The non-elastic flexible sheet material of the front seat support structure 68 comprises a central front seat region 72 and at least two lateral front seat segments 76*a*, 76*b*. The central front seat region 72 has two opposite lateral edges 74 and a front and a rear edge. Each lateral front seat segment 76*a*, 76*b* of the at least two lateral front seat segments 76*a*, 76*b* has an inner and an outer lateral edge. Each lateral front seat segment 76*a*, 76*b* is connected with its inner lateral edge with the lateral edge 74 of the central front seat region and with its outer edge with a lateral front seat frame member.

A rear region of the front seat support structure 68 overlaps with a front region of the seat support structure 48. The total depth of the seat support structure 48 and the front seat support structure 68 is adjustable by adjusting the position of the front seat frame 62 relative to the rigid seat frame 42. Thus, the depth of the seat 14 may be matched to the length of the thigh of the seated person.

The various embodiments which are described above may be used implemented independently from one another and may be combined with one another in various ways. The reference numbers used in the detailed description and the claims do not limit the description of the embodiments nor do they limit the claims. The reference numbers are solely used to clarify by referring to the non-limiting example in the figures.

LEGEND

10—backrest
12—(wheel)chair
14—seat
16—backrest frame
18, 20—lateral backrest frame member
22—back support structure
24—backrest support surface
26—first central region segment
28—second central region segment
30—third central region segment
32—lateral edge (of central region)
34*a*, 34*b*, 36*a*, 36*b*, 38*a*, 38*b*—lateral segment
42—seat frame
44, 46—lateral seat frame member
48—seat support structure
50—seat support surface
52—first central seat region segment
54—second central seat region segment
56—lateral edge (of central seat region)
58*a*, 58*b* 60*a*, 60*b*—lateral seat segment
62—front seat frame
64, 66—lateral front seat frame member
68—front seat support structure
70—front seat support surface
72—central front seat region
74—lateral edge (of central front seat region)
76*a*, 76*b*—lateral front seat segment
78—cross member
80—strap
82—groove

The invention claimed is:

1. A backrest for supporting the back of a seated person, the person having a vertebral column which has a sacral region, a lumbar region defined by lumber vertebrae, a thoracic region defined by thoracic vertebrae and a cervical region defined by cervical vertebrae and which has, when viewed in a cross section along a sagittal plane has a vertebral curvature, the backrest comprising:

a rigid backrest frame having two opposite lateral backrest frame members, wherein the lateral backrest frame members are shaped along a lateral backrest frame curvature;

a back support structure which comprises flexible sheet material;

wherein the flexible sheet material is substantially non-elastic and comprises:

a central region having two opposite lateral edges and an upper and a lower edge;

at least four lateral segments, wherein each lateral segment has an inner and an outer lateral edge, wherein each lateral segment is connected with its inner lateral edge with the lateral edge of the central region and with its outer edge with an associated one of the lateral backrest frame member, wherein the lateral segments are arranged in pairs of lateral segments which are connected to the central region at the same height to the opposite lateral edges of the central region, wherein a first pair of lateral segments is connected to a first central region segment and wherein a second pair of lateral segments is connected to a second central region segment;

wherein the non-elastic flexible sheet material provides, in a loaded condition wherein a back of a user is against the backrest, a form-stable backrest support surface having a three-dimensionally curved shape of which a cross-sectional view in the sagittal plane that is substantially vertical and centrally positioned between the two lateral backrest frame members, has a backrest support surface curvature, wherein the outer edges of the lateral segments are provided with a cord, and each lateral backrest frame member comprises a groove extending along the length of the lateral backrest frame member and having a groove opening extending along the length of the groove with a width which is smaller than an outer diameter of the cord, wherein the cord is mounted in the groove for connecting the outer edges of the lateral segments to an associated one of the lateral backrest frame members, and wherein the outer edges of the lateral segments are provided with at least two seam tunnels in which the cord is selectively accommodated, wherein the seam tunnel in which the cord is accommodated is mounted in the groove for connecting the outer edges of the lateral segments to an associated one of the lateral backrest frame members.

2. The backrest according to claim 1, wherein the substantially non-elastic, flexible sheet material is selected from the group consisting of canvas, cloth and foil.

3. The backrest according to claim 1, wherein the at least four lateral segments comprise a third pair of lateral segments connected to a third central region segment.

4. The backrest according to claim 1, wherein the at least four lateral segments comprise a fourth pair of lateral segments connected to a fourth central region segment.

5. The backrest according to claim 1, wherein each lateral segment comprises a patch of non-elastic, flexible sheet material, wherein the central region comprises at least one patch of non-elastic, flexible sheet material, wherein the lateral patches are connected to the central region by seams.

6. The backrest according to claim 5, wherein the first and second segments of the central region each comprise a patch of non-elastic, flexible sheet material, wherein an upper edge of the patch forming the second segment is connected by a seam to a lower edge of the patch forming the first segment.

7. The backrest according to claim 5 wherein the at least four lateral segments comprise a third pair of lateral segments connected to a third central region segment, and wherein the third segment of the central region comprises a patch of non-elastic, flexible sheet material, wherein the lower edge of the patch forming the third segment is connected by a seam to an upper edge of the patch forming the first segment.

8. The backrest according to claim 7 wherein the at least four lateral segments comprise a fourth pair of lateral segments connected to a fourth central region segment, and wherein the fourth segment of the central region comprises a patch of non-elastic, flexible sheet material, wherein an upper edge of the patch forming the fourth segment is connected by a seam to a lower edge to a lower edge of the patch forming the second segment.

9. The backrest according to claim 5, wherein the central region is integrally formed from a single patch of non-elastic, flexible sheet material.

10. The backrest according to claim 1, wherein the rigid backrest frame is collapsible from a working condition to a collapsed condition, wherein in the working condition the lateral backrest frame members are spaced apart from each other at a first distance, wherein in the collapsed condition the lateral backrest frame members are moved towards each other and the back support structure is folded in a collapsed condition.

11. The backrest according to claim 1, wherein each lateral backrest frame member is composed of an upper lateral backrest frame member part and a lower lateral backrest frame member part, wherein the upper and the lower lateral backrest frame member parts are pivotable with respect to each other around a substantially horizontally extending pivot axis, wherein the lateral segments of the first pair of lateral segments are each connected to the upper lateral backrest frame member part associated with that lateral segment, and wherein the lateral segments of the second pair of lateral segments are each connected to the lower lateral backrest frame member part associated with that lateral segment, wherein the lower lateral backrest frame member parts can be fixed in various pivot positions to support buttocks of the user when seated.

12. The backrest according to claim 1, wherein the first central region segment in the loaded condition extends in a plane that encloses an angle with a horizontal plane in a range between 100° and 130°.

13. The backrest according to claim 1, wherein each lateral segment of the first pair of lateral segments is associated with two straps having only a discrete number of setting lengths, for setting the lateral width of each one of the first pair of lateral segments, and wherein each lateral segment of the second pair of lateral segments is associated with a single strap, of which the length is settable along a continuous range.

14. A chair for supporting a seated person, comprising:

a seat; and the backrest according to claim 1.

15. The chair according to claim 14, wherein the chair includes wheels so as to form a wheelchair.

16. A backrest for supporting the back of a seated person, the person having a vertebral column which has a sacral region, a lumbar region defined by lumber vertebrae, a thoracic region defined by thoracic vertebrae and a cervical region defined by cervical vertebrae and which has, when viewed in a cross section along a sagittal plane has a vertebral curvature, the backrest comprising:

a rigid backrest frame having two opposite lateral backrest frame members, wherein the lateral backrest frame members are shaped along a lateral backrest frame curvature;

a back support structure which comprises flexible sheet material;

wherein the flexible sheet material is substantially non-elastic and comprises:

a central region having two opposite lateral edges and an upper and a lower edge;

at least four lateral segments, wherein each lateral segment has an inner and an outer lateral edge, wherein each lateral segment is connected with its inner lateral edge with the lateral edge of the central region and with its outer edge with an associated one of the lateral backrest frame member, wherein the lateral segments are arranged in pairs of lateral segments which are connected to the central region at the same height to the opposite lateral edges of the central region, wherein a first pair of lateral segments is connected to a first central region segment and wherein a second pair of lateral segments is connected to a second central region segment;

wherein the non-elastic flexible sheet material provides, in a loaded condition wherein a back of a user is against the backrest, a form-stable backrest support surface having a three-dimensionally curved shape of which a cross-sectional view in the sagittal plane that is substantially vertical and centrally positioned between the two lateral backrest frame members, has a backrest support surface curvature, and wherein each lateral segment of the first pair of lateral segments is associated with a strap two straps having only a discrete number of setting lengths, for setting the lateral width of each one of the first pair of lateral segments, and wherein each lateral segment of the second pair of lateral segments is associated with a single strap, of which the length is settable along a continuous range.

17. The backrest according to claim 16, wherein the outer edges of the lateral segments are provided with a cord, and each lateral backrest frame member comprises a groove extending along the length of the lateral backrest frame member and having a groove opening extending along the length of the groove with a width which is smaller than an outer diameter of the cord, wherein the cord is mounted in the groove for connecting the outer edges of the lateral segments to an associated one of the lateral backrest frame members.

18. The backrest according to claim 17, wherein the outer edges of the lateral segments are provided with at least two seam tunnels in which the cord is selectively accommodated, wherein the seam tunnel in which the cord is accommodated is mounted in the groove for connecting the outer edges of the lateral segments to an associated one of the lateral backrest frame members.

19. A backrest for supporting the back of a seated person, the person having a vertebral column which has a sacral region, a lumbar region defined by lumber vertebrae, a thoracic region defined by thoracic vertebrae and a cervical region defined by cervical vertebrae and which has, when viewed in a cross section along a sagittal plane has a vertebral curvature, the backrest comprising:

a rigid backrest frame having two opposite lateral backrest frame members, wherein the lateral backrest frame members are shaped along a lateral backrest frame curvature;

a back support structure which comprises flexible sheet material;

wherein the flexible sheet material is substantially non-elastic and comprises:

a central region having two opposite lateral edges and an upper and a lower edge;

at least four lateral segments, wherein each lateral segment has an inner and an outer lateral edge, wherein each lateral segment is connected with its inner lateral edge with the lateral edge of the central region and with its outer edge with an associated one of the lateral backrest frame member, wherein the lateral segments are arranged in pairs of lateral segments which are connected to the central region at the same height to the opposite lateral edges of the central region, wherein a first pair of lateral segments is connected to a first central region segment and wherein a second pair of lateral segments is connected to a second central region segment;

wherein the non-elastic flexible sheet material provides, in a loaded condition wherein a back of a user is against the backrest, a form-stable backrest support surface having a three-dimensionally curved shape of which a cross-sectional view in the sagittal plane that is substantially vertical and centrally positioned between the two lateral backrest frame members, has a backrest support surface curvature, and wherein a lateral width of the back support structure is variable.

20. A chair having a seat comprising:

a rigid seat frame having two opposite lateral seat frame members, wherein the lateral seat frame members are shaped along a lateral seat frame curvature; and a seat support structure comprising flexible sheet material; wherein the flexible sheet material is substantially non elastic and comprises:

a central seat region having two opposite lateral edges and a front and a rear edge;

at least four lateral seat segments, wherein each lateral seat segment has an inner and an outer lateral edge, wherein each lateral seat segment is connected with its inner lateral edge with the lateral edge of the central seat region and with its outer edge with a lateral seat frame member, wherein the lateral seat segments are arranged in pairs of lateral seat segments which are connected to the central seat region at directly opposite parts of the lateral edges of the central seat region, wherein a first pair of lateral seat segments is connected to a first central seat region segment and wherein a second pair of lateral seat segments is connected to a second central seat region segment;

wherein the non-elastic flexible sheet material provides, in a loaded condition wherein buttocks of a user are on the seat, a form-stable seat support surface having a three-dimensionally curved shape of which a cross-sectional view in the sagittal plane that is substantially vertical and centrally positioned between the two lateral seat frame members, has a seat support surface curvature, the seat further comprising:

a front seat frame having two opposite lateral front seat frame members, wherein the lateral front seat frame members are adjustably connected to the lateral frame members of the rigid seat frame to vary a seat depth of the seat support structure; and a front seat support structure comprising substantially non-elastic flexible sheet material, wherein the non-elastic flexible sheet material provides, in the loaded condition, a form-stable front seat support surface, wherein the non-elastic flexible sheet material of the front seat support structure comprises:

a central front seat region having two opposite lateral edges and a front and a rear edge; and at least two lateral front seat segments, wherein each lateral front seat segment has an inner and an outer lateral edge, wherein each lateral front seat segment is connected with its inner lateral edge with the lateral edge of the central front seat region and with its outer edge with a lateral front seat frame member, wherein a rear region of the front seat support structure overlaps with a front region of the seat support structure, wherein the total depth of the seat support structure and the front seat support structure is adjustable by adjusting the position of the front seat frame relative to the rigid seat frame.

21. The chair according to claim 20, wherein the first central seat region segment substantially extends in a plane that includes an angle with a horizontally extending plane in the range of 5° to 15°.

22. The chair according to claim 20, wherein the chair includes wheels so as to form a wheelchair.

* * * * *